United States Patent [19]

Schneider

[11] Patent Number: 5,169,239
[45] Date of Patent: Dec. 8, 1992

[54] ROLLER BEARING AND CASE ASSEMBLY

[75] Inventor: Dean J. Schneider, Highland, Mich.

[73] Assignee: GKN Automotive, Inc., Auburn Hills, Mich.

[21] Appl. No.: 777,690

[22] Filed: Oct. 15, 1991

[51] Int. Cl.⁵ .............................................. F16C 29/06
[52] U.S. Cl. ................................................... 384/44
[58] Field of Search ........................... 384/44, 43, 45; 464/111, 168, 132, 906

[56] References Cited

U.S. PATENT DOCUMENTS

| | | |
|---|---|---|
| 4,619,628 | 10/1986 | Orain . |
| 4,729,670 | 3/1988 | Murphy et al. . |
| 4,768,990 | 9/1988 | Farrell et al. . |
| 4,768,994 | 9/1988 | Stenglein .............................. 464/168 |
| 4,773,890 | 9/1988 | Iwasaki et al. . |
| 4,840,600 | 6/1989 | White et al. ......................... 464/111 |
| 5,073,144 | 12/1991 | Stenglein et al. ..................... 384/44 |

Primary Examiner—Lenard A. Footland
Attorney, Agent, or Firm—Harness, Dickey & Pierce

[57] ABSTRACT

The present invention discloses an improved roller assembly. The roller assembly is used primarily for a constant velocity tripod joint. The roller assembly comprises a rectangular base, a plurality of needle rollers and a one piece rectangular cover. The rectangular cover is attached to the rectangular base by a snap ring or a staking operation.

3 Claims, 2 Drawing Sheets

ROLLER BEARING AND CASE ASSEMBLY

BACKGROUND OF THE INVENTION

This invention relates to a roller bearing and cage assembly. More particularly, the invention relates to a tripod constant velocity roller bearing and cage assembly.

Tripod constant velocity universal joints are used extensively throughout the automotive industry. The tripod joint transmits power between the engine or transmission and the wheels of a vehicle. A typical tripod joint is shown in U.S. Pat. No. 4,773,890 issued to Iwasaki et al. on Sep. 27, 1988.

The tripod constant velocity joint consists of an outer housing with three circumferentially spaced, longitudinally extending chambers. Disposed within these three chambers is a spider assembly. The spider assembly comprises a spider with three trunnions, a set of three rollers and a plurality of needle bearings. Each of the three trunnions extend into a respective chamber of the outer housing. A roller is journaled around each trunnion. A plurality of needle bearings are positioned between the trunnion and the roller. The tripod joint is thus capable of transmitting power while at the same time accommodating for both angular and longitudinal movement.

One disadvantage of the tripod joint is the phenomena known as "shudder". Shudder is a third order axial vibration caused by the joint during operation. When the joint operates at an angle, the plane of the rollers is skewed relative to the plane of their respective longitudinal chamber. As the roller moves along the track at an angle, it has a tendency to slide instead of roll. This sliding action is one of the main causes of the third order axial vibration known as shudder. As the angle of the joint increases, the amount of sliding action increases and therefore the shudder phenomena is greater.

Various tripod constant velocity joints have been designed with internal components which separate the responsibility of providing angular and longitudinal travel. U.S. Pat. No. 4,619,628 issued to Orain on Oct. 28, 1986 is one example. U.S. Pat. No. 4,768,990 issued to Farrell et al. on Sep. 6, 1988 is another.

The Farrell et al. tripod joint uses a complicated drive assembly on each of its respective spherical trunnions to accommodate both the angular and longitudinal movement of the joint. One version of this drive assembly was the subject of U.S. Pat. No. 4,729,670 issued to Murphy et al. on Mar. 8, 1988.

The drive assembly or roller bearing in the Murray et al. patent comprises a roller block, a plurality of needles, and a roller sleeve. The roller sleeve is either a single or multiple piece component. One disadvantage of the Murphy et al. roller bearing is the complicated and expensive design of the roller sleeve as well as the difficult method required to assemble the roller bearing.

Accordingly it is desirous to have a roller bearing which is relatively inexpensive and reliable and also simplifies the procedure to assemble the roller bearing.

SUMMARY OF THE INVENTION

The present invention discloses an improved roller assembly. The roller assembly comprises a rectangular base, a plurality of needle rollers and a one piece rectangular cover. The rectangular cover is attached to the rectangular base by a snap ring or a staking operation.

From the following detailed description, drawings and subjoined claims, other objects and advantages of the present invention will become apparent to those skilled in the art.

DESCRIPTION OF THE PREFERRED EMBODIMENT

Figure 1:
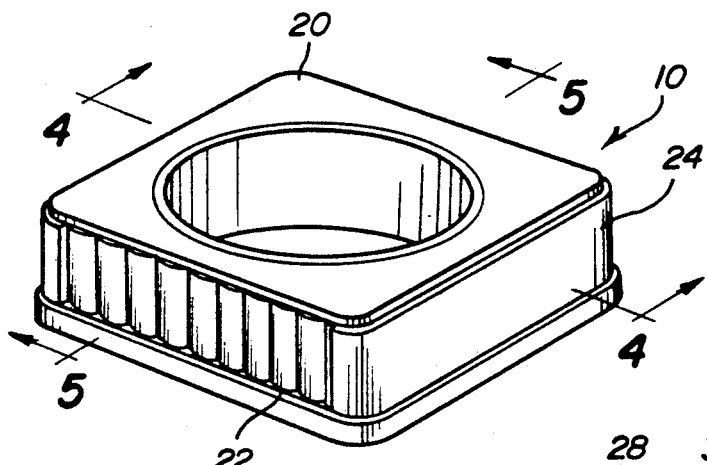
FIG. 1 is a perspective view of the roller bearing and cage assembly in accordance with the present invention.
Figure 2:
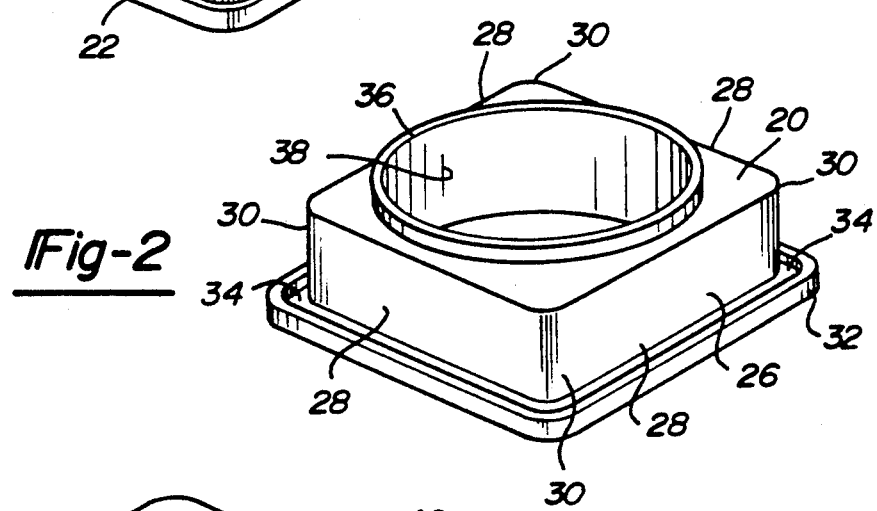
FIG. 2 is a perspective view of the rectangular base in accordance with the present invention.
Figure 3:
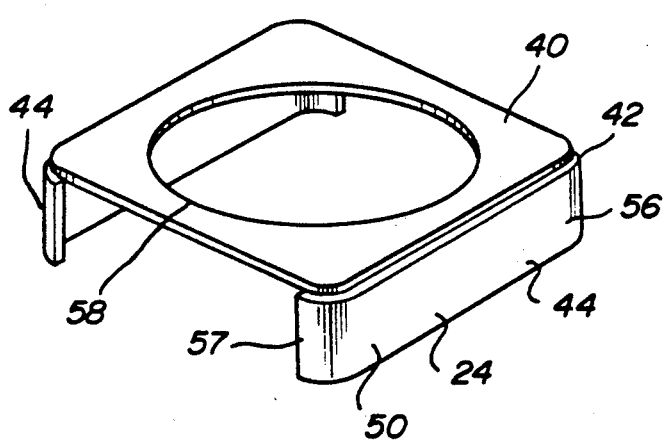
FIG. 3 is a perspective view of the single piece cover in accordance with the present invention.

A roller bearing and cage assembly in accordance with the present invention is shown in FIGS. 1, 2 and 3 and is designated by the numeral 10.

The roller bearing and cage assembly comprises a rectangular base 20, a plurality of needle rollers 22 and a rectangular cover 24.

The rectangular base 20 has a central bore 38 and a bearing surface 26 which includes four planer sides 28 connected by four radiused corners 30. A flange 32 completely surrounding and located on one end of the rectangular base 20 has a bearing guideway 34 which is used to guide one end of the needle rollers 22 as they move around the bearing surface 26. An annular ring 36 is located on the rectangular base 20 on the side opposite of the flange 32. The inside diameter of the annular ring 36 is the same diameter as the central bore 38 of the rectangular base 20. The annular ring 36 is used for retaining the rectangular cover 24 as will be described herein.

Figure 4:
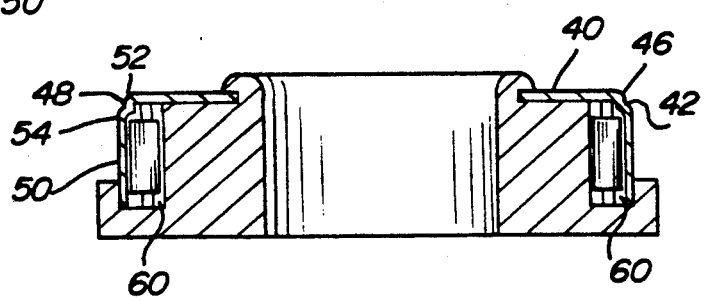
FIG. 4 is a sectional view of FIG. 1 along line 4—4 thereof.
Figure 5:
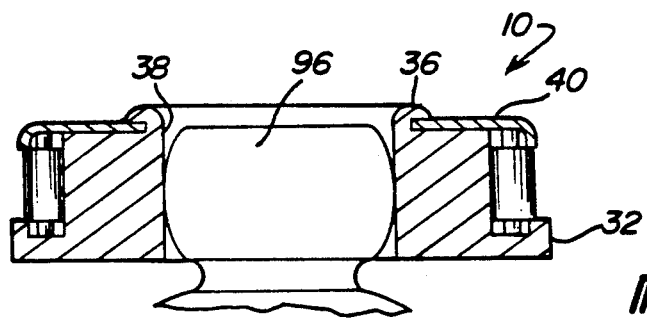
FIG. 5 is a sectional view of FIG. 1 along line 5—5 thereof.

The rectangular cover 24 comprises a rectangular plate 40, a bearing guideway 42, and a pair of bearing retainers 44. The rectangular plate 40 has a centrally located cylindrical hole 58. The size of the cylindrical hole 58 is equal to or slightly larger than the outside diameter of the annular ring 36 of the rectangular base 20. The bearing guideway 42 completely surrounds and is perpendicular to the rectangular plate 40. The bearing guideway 42 is connected to the outside edge of rectangular plate 40 by radiused section 46 as shown in FIG. 4. The bearing retainers 44 are on opposite sides of the rectangular plate 40. They each comprise a flanged section 48 and a wall section 50. Each flange section is substantially parallel with the rectangular plate 40 and is connected to a portion of the bearing guideway 42 by radiused section 52. Each wall section 50 is substantially perpendicular to the rectangular plate 40 and is attached to the flange section 48 by radiused section 54.

Wall section 50 comprises a substantially straight section 56 and a pair of curved sections 58 located at opposite ends of the straight section 56 as shown in FIG. 3.

Assembly of the roller bearing and cage assembly 10 is accomplished by first journaling a plurality of needle rollers 22 around the rectangular block 20. A sufficient number of needle rollers 22 are used such that the bearing surface 26 is substantially covered by the needle rollers 22. The needle rollers 22 are journaled in the bearing guideway 34 of the rectangular block 20.

The rectangular cover 24 is then placed over the top of the rectangular base 20. The rectangular cover 24 is positioned such that the bearing guideway 42 journals the other end of the needle rollers 22. The bearing retainers 44 form a pair of passages 60 for the needle rollers to travel through as they traverse around the rectangular base 20.

The cylindrical hole 58 of the rectangular cover 24 is positioned over the annular ring 36 of the rectangular base 20 such that the rectangular plate 40 rests against the body of the rectangular base 20. The annular ring 36 is then staked by conventional means to retain the rectangular cover 24 as shown in FIG. 4.

Figure 6:
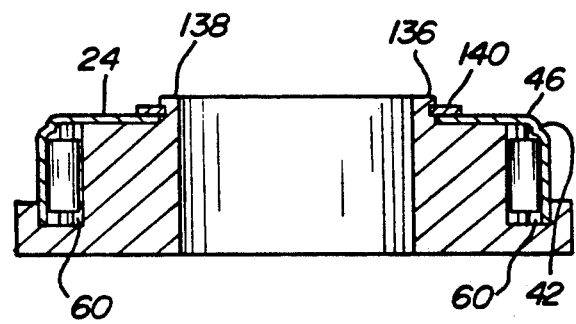
FIG. 6 is a sectional view of FIG. 1 similar to FIG. 4 but showing an alternative retention means.

FIG. 6 shows an alternate means of retaining the rectangular cover 24. In this embodiment, the annular ring 136 has a groove 138 machined into its outside surface. Once the rectangular cover 24 is placed over the annular ring 136, a snap ring 140 is placed in the groove 138 of the annular ring 136.

Once the roller bearing and cage assembly is assembled by either of the above procedures, the plurality of needle rollers 22 are free to traverse around the bearing surface 26 of the rectangular base 20. The needle rollers 22 traverse from being retained by the guideways 34 and 42 to being channeled through the passageways 60.

Figure 7:
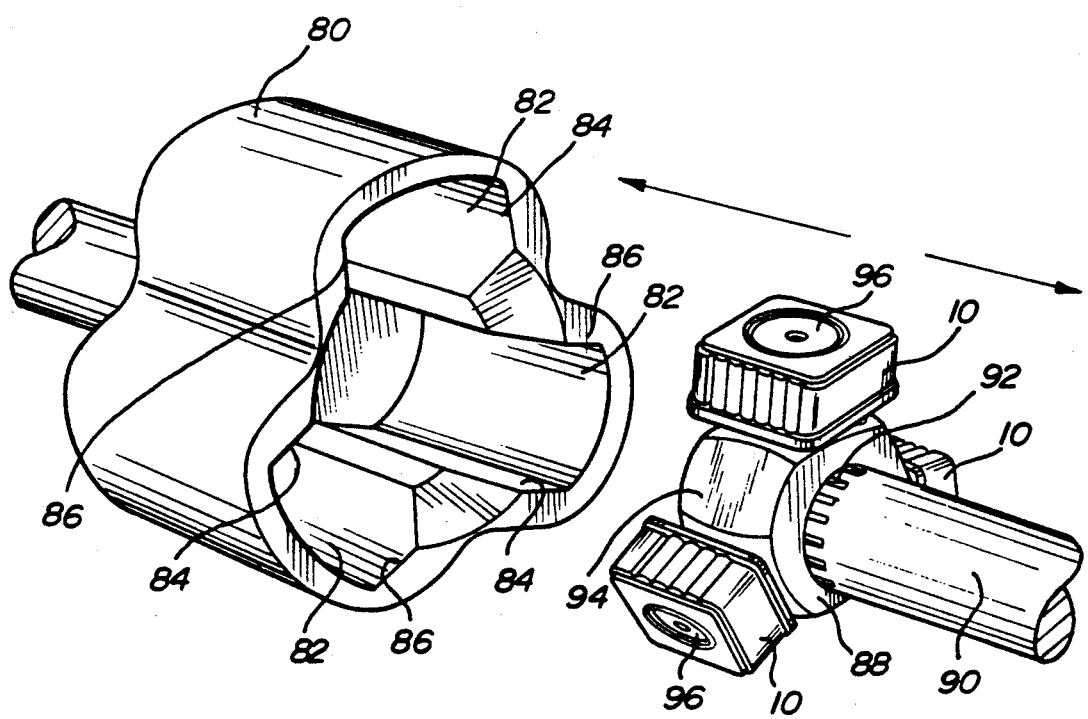
FIG. 7 is a perspective view of the roller bearing and cage assembly in accordance with the present invention being used in a tripod constant velocity joint.

FIG. 7 shows the roller bearing and cage assembly 10 being used in a tripod constant velocity joint. The tripod joint comprises an outer housing 80 with three circumferentially spaced longitudinally extending chambers 82. Each chamber has longitudinal sidewalls 84, 86. Disposed within these three chambers is a spider assembly 88. The spider assembly 88 can be integral with shaft 90 or can be connected with shaft 90 by a spline means 92 as shown in FIG. 7. The spider assembly comprises a spider 94 with three spherical trunnions 96. A roller bearing and cage assembly 10 is assembled onto each of the trunnions 96. The spider assembly 88 is then inserted into the outer housing 80, such that the needle rollers 22 of the roller bearing and cage assembly 10 are in rolling contact with the longitudinal sidewalls 84, 86 of the outer housing 80.

Upon operation of the tripod joint, as the spider assembly 88 moves longitudinally with respect to the outer housing 80, the needle rollers 22 roll against the longitudinal sidewalls 84 and 86 and the bearing surface 26 of the rectangular base 20. The needle rollers 22 traverse around the bearing surface 26 being guided by the bearing guideways 34 and 42.

Angular movement of the shaft 90 in relationship to the longitudinal chambers 82 is accomplished by the angular movement of the spherical trunnion 96 with respect to the central bore 38 of the rectangular base 20. In this way, the roller bearing and cage assembly 10 is allowed to remain substantially parallel to the longitudinal chambers 82 thus allowing true rolling movement during longitudinal travel of the spider assembly 88.

While the above detailed description describes the preferred embodiment of the present invention, it should be understood that the present invention is susceptible to modification, variation and alteration without deviating from the scope and fair meaning of the subjoined claims.

What is claimed is:

1. A roller bearing comprising:
    a rectangular base, having a first end and a second end, said rectangular base having a bearing surface including four planar sides connected by radiused corners;
    a flange located at said first end of said rectangular base, said flange completely surrounding said rectangular base and defining a first bearing guideway;
    a rectangular cover having a central aperture and located at said second end of said rectangular base, said rectangular cover defining a second bearing guideway located between said rectangular cover and said rectangular base, said rectangular cover further defining a pair of bearing passageways between said rectangular cover and said rectangular base, each of said passageways being on opposite sides of said rectangular base;
    a plurality of needle bearings journaled in said first and second bearing guideways in rolling contact with said bearing surface of said rectangular base; and
    retention means for securing said rectangular cover to said rectangular base.

2. The roller bearing of claim 1 wherein said retention means comprises:
    an annular ring having a snap ring groove; and
    a snap ring located in said snap ring groove such that said rectangular cover is retained between said snap ring and said rectangular base.

3. The roller bearing of claim 1 wherein said retention means is an integral annular ring.

* * * * *

UNITED STATES PATENT AND TRADEMARK OFFICE
CERTIFICATE OF CORRECTION

PATENT NO. : 5,169,239

DATED : December 8, 1992

INVENTOR(S) : Dean J. Schneider

It is certified that error appears in the above-identified patent and that said Letters Patent is hereby corrected as shown below:

Cover Page, in the Title, "CASE" should be ---CAGE---.

Column 1, line 2, in the title "CASE" should be ---CAGE---.

Column 2, line 64, "58" should be ---57---.

Signed and Sealed this

Second Day of November, 1993

Attest:

BRUCE LEHMAN

Attesting Officer     Commissioner of Patents and Trademarks